(12) United States Patent
Savir et al.

(10) Patent No.: US 11,385,922 B2
(45) Date of Patent: Jul. 12, 2022

(54) ELASTIC CLOUD SERVICE WITH DATA DRIVEN COST REDUCTION FOR VMS IN THE CLOUD

(71) Applicant: EMC IP Holding Company LLC, Hopkinton, MA (US)

(72) Inventors: Amihai Savir, Sansana (IL); Avitan Gefen, Lehavim (IL); Roi Gamliel, Moshav Tkuma (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 97 days.

(21) Appl. No.: 16/654,625

(22) Filed: Oct. 16, 2019

(65) Prior Publication Data

US 2021/0117216 A1 Apr. 22, 2021

(51) Int. Cl.
*G06F 9/455* (2018.01)
*G06F 9/445* (2018.01)
*G06F 9/50* (2006.01)

(52) U.S. Cl.
CPC ........ *G06F 9/45558* (2013.01); *G06F 9/4451* (2013.01); *G06F 9/5072* (2013.01); *G06F 2009/45562* (2013.01); *G06F 2009/45575* (2013.01); *G06F 2009/45591* (2013.01); *G06F 2009/45595* (2013.01)

(58) Field of Classification Search
CPC .. G06F 9/45558; G06F 9/4451; G06F 9/5072; G06F 2009/45591; G06F 2009/45562
See application file for complete search history.

(56) References Cited

U.S. PATENT DOCUMENTS

| | | | |
|---|---|---|---|
| 2012/0089980 A1* | 4/2012 | Sharp | G06F 9/45558 718/1 |
| 2012/0226796 A1* | 9/2012 | Morgan | H04L 67/10 709/224 |
| 2014/0082165 A1* | 3/2014 | Marr | G06F 9/5044 709/222 |
| 2015/0007173 A1* | 1/2015 | Ionescu | G06F 9/45533 718/1 |
| 2016/0057041 A1* | 2/2016 | Gupta | H04L 41/5025 706/12 |

* cited by examiner

*Primary Examiner* — Dong U Kim
(74) *Attorney, Agent, or Firm* — Workman Nydegger

(57) ABSTRACT

One example method includes collecting telemetry data for each of a group of virtual machines (VM), and each of the VMs is associated with a user, collecting usage data for each of the VMs, creating a user profile definition for each user, and the user profile definition is created based on the telemetry data and usage data of the VMs associated with that user, creating, for each user, a user profile that is based on the user profile definition for that user, clustering the users based on similarity of their respective user profiles, and generating a recommended VM hardware configuration for a VM of one of the users.

20 Claims, 4 Drawing Sheets

ELASTIC CLOUD SERVICE WITH DATA DRIVEN COST REDUCTION FOR VMS IN THE CLOUD

FIELD OF THE INVENTION

Embodiments of the present invention generally relate to the allocation of cloud resources in connection with the implementation of a new VM. More particularly, at least some embodiments of the invention relate to systems, hardware, software, computer-readable media, and methods for determining optimal values for various VM parameters.

BACKGROUND

Cloud resource allocation can be challenging, especially when a user applies for the implementation of one or more new VMs in the cloud. In this case, the user may asked to specify various parameters for the desired VM. Examples of such parameters may include the amount of RAM, CPU frequency and number of cores, GPU type and size, and storage.

However, it is difficult to estimate the optimal value for parameters such as these. Further, over, or under, estimation of the parameter values has negative consequences. For example, overestimating may result in the user paying for more capability than is actually needed, while underestimating may leave the user with a less than capable VM that is not able to fully carry out its tasks.

Thus, it would be useful to be able to estimate optimal values for VM parameters. Such estimation, and associated, processes may enable performance standards to be met, while also helping to ensure cost compliance.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
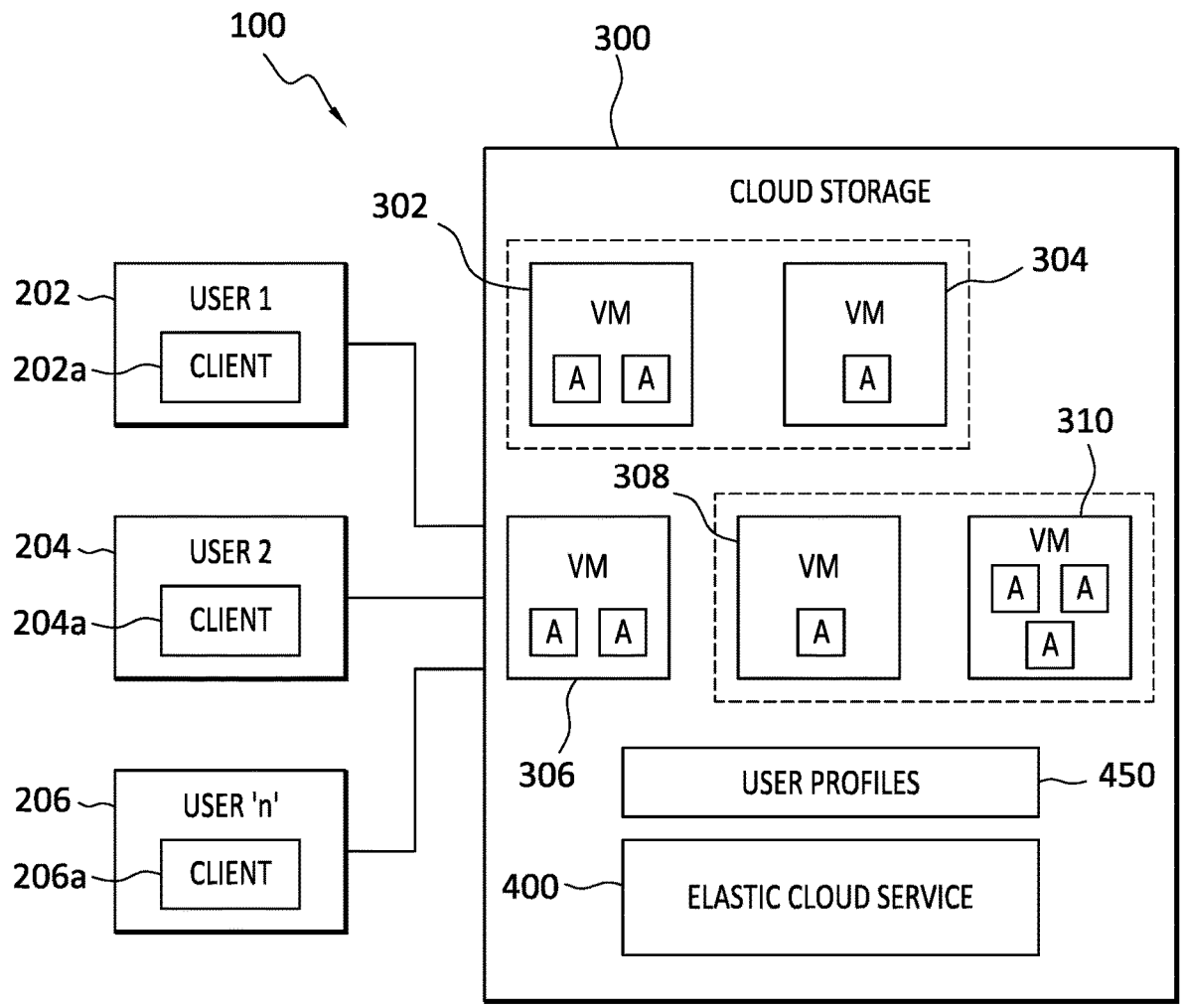
FIG. 1 discloses aspects of an example architecture and operating environment.

Embodiments of the present invention generally relate to the allocation of cloud resources in connection with the implementation of one or more new, or modified, virtual machines (VM). More particularly, at least some embodiments of the invention relate to systems, hardware, software, computer-readable media, and methods for determining optimal values for various VM parameters.

In general, at least some example embodiments include and/or employ a machine learning (ML) recommender system and different collected data sources to automatically suggest an optimal VM configuration to run a given workload, at the lowest cost. In this way, VM performance demands may be balanced with budget constraints, while providing a custom-tailored VM configuration recommendation to the user. Thus, embodiments of the invention may be well suited to resolve, or at least attenuate, circumstances such as those noted in the following discussion.

For example, when a user VM is experiencing low performance, the user might decide to first define the typical usage. Such typical usage might be defined in terms of what software and applications are in use, and how intensively, and when and why the VM suffers from low performance. However, a human user may not be able to evaluate these questions fully objectively, with the result that the user may draw incorrect conclusions as to the resources actually needed.

As well, performance issues and other problems could recur several times before a user realizes that, for example, a specific resource is a bottle-neck and should be extended. Thus, rather than dealing with a particular problem only once, the user might have to address that problem several times before the problem is ultimately resolved.

Further, it might be challenging for a user to determine what is the optimized VM for their particular needs. For example, it may be difficult to determine what configuration would support the needs of the application, or applications, the user wants to execute. Such a situation might become more complicated if the user always striving to maximize the value received in a limited budget situation.

As these examples demonstrate, it may be difficult for a human user to optimize the configuration of one or more VMs, particularly in dynamic operating environments where, for example, computing resource availability, applications, and customer needs, are constantly changing. Thus, defining optimized VM configurations for multiple VMs, in dynamic operating environments, is beyond the practical capability of a human to perform either effectively or efficiently, or at all.

In general, example embodiments of the invention may collect data from virtual servers in a storage environment. Such data may include, for example, vCenter operations (or "VC-Ops") data that includes telemetry data, a list of applications installed, and a list of applications that are commonly used. Note that as used herein, vCenter refers to VMware vCenter Server, a server management software that provides a centralized platform for controlling VMware vSphere environments, allowing automation and delivery of a virtual infrastructure across a cloud, such as a hybrid cloud. Embodiments of the invention are not limited to this server management platform however.

Using the collected data, a user profile definition may be created, and used to produce a user profile for each user in a cloud environment, for example. The users in the cloud environment may be clustered together in various clusters, based on their respective user profiles. Within each cluster, a VM configuration may be suggested for each user that is experiencing any performance problems and/or is paying for resources in excess of what is needed. As cost and performance data are gathered, the recommendations may, through the use of ML and/or other techniques, be refined, profile definitions and user profiles may be changed, and/or, the clusters may gain or lose users. As well, new clusters may be created, and old clusters eliminated.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an embodiment of the invention may rapidly respond to changing conditions in a dynamic operating environment to develop, implement, and/or refine, one or more VM configurations. An embodiment of the invention may automatically define and implement VM configurations that strike a balance, which may be optimal, between VM performance and the cost to implement and use the VM. An embodiment of the invention may identify and resolve, through the definition and implementation of custom VM configurations, operational and performance problems that are beyond the ability of a human to timely and effectively identify and/or resolve. An embodiment of the invention may automatically develop, implement, and/or, refine one or more VM configurations that are customized to suit the technical requirements and budget of a particular user, or group of users.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, operations that may be related to systems and devices such as VMs for example. Such operations may include, but are not limited to, gathering data concerning VM performance, application performance and requirements, and/or, budget constraints, creating user profile definitions and user profiles, defining user clusters, defining, implementing, and/or refining, one or more VM configurations automatically, cloud data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, the Microsoft Azure platform, the Amazon Web Services (AWS) Simple Storage Service (S3) platform, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may include one or more users 202, 204, and 206, each of which may include a respective instance of a client 202a, 204a, and 206a, configured to interact directly, or indirectly, with one or more elements of a cloud storage environment 300.

The cloud storage environment 300 may include, for each of the users 202, 204, and 206, a respective set of one or more VMs 302, 304, 306, 308, and 310. As indicated in the example of FIG. 1, VMs 302 and 304 may collectively comprise a first group of VMs that are used by, or otherwise associated with, user 202. Similarly, VM 306 comprises a second group that is used by, or otherwise associated with, user 204, while VMs 308 and 310 collectively comprise a third group of VMs that are used by, or otherwise associated with, user 206. One, some, or all, of the VMs 302 . . . 310 may take the form of a virtual server, although that is not necessarily required, and no VM is required to be implemented as a virtual server.

Each of the VMs 302, 304, 306, 308, and 310 may include a respective set of one or more applications "A," which may be of any type and function, that run on the respective VM. To illustrate with an example, user 202 may be a financial institution that runs various financial programs "A" on VMs 302 and 304. As a further example, user 204 may be a technical organization that runs an engineering design program "A" on VM 306.

As shown in FIG. 1, the cloud storage environment 300 may further comprise an elastic cloud service (ECS) 400 which, among other things, may create, modify, delete, and store, user profiles 450 and associated data such as, but not limited to, user profile definitions, and performance, utilization, and configuration, information concerning one or more of the applications "A" hosted on one or more of the VMs 302 . . . 310. In general, and as explained in further detail elsewhere herein, the ECS 400 may interact with one or more of the clients 202a, 204a, and 206a, to define and implement one or more user profiles 450 relating to the respective VMs, and associated applications "A," of the users 202, 204 and 206. As part of its operations, the ECS 400 may also group users, such as users 202 . . . 206 for example, into groups based on the respective user profiles of those users.

B. Example Host and Server Configurations

Figure 2:
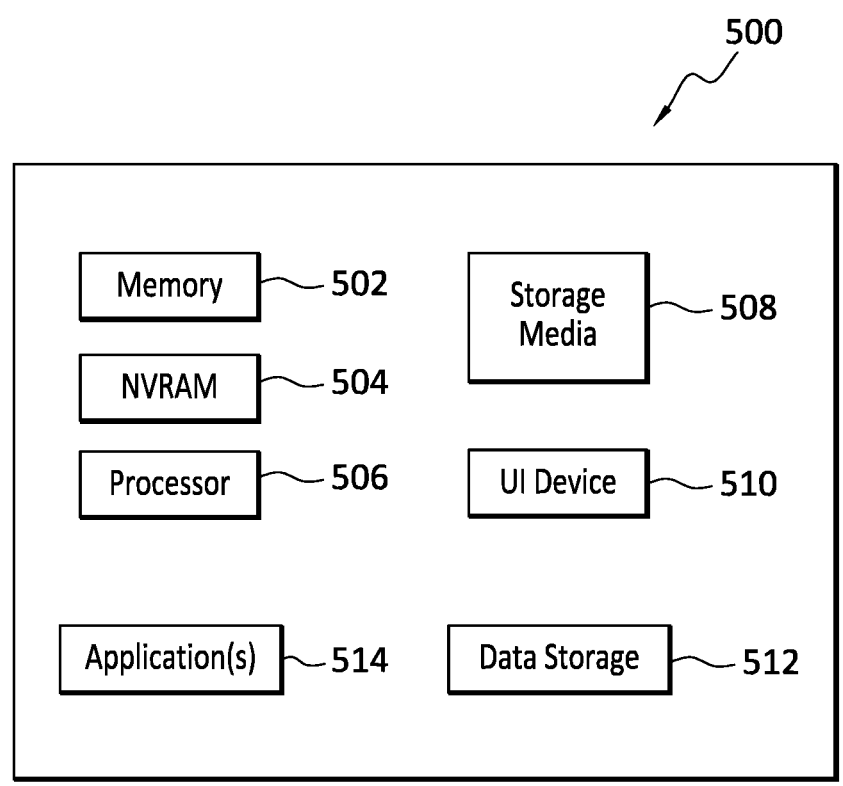
FIG. 2 discloses aspects of an example host device.

With reference briefly now to FIG. 2, any one or more of the entities disclosed, or implied, by FIG. 1 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 2.

In the example of FIG. 2, the physical computing device 500 includes a memory 502 which may include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, methods, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein.

C. General Aspects of Example User Profiles and Associated Operations

As noted earlier, example embodiments may be employed in connection with various cloud storage sites and vendors. The different cloud vendors may provide virtualization for virtual servers. For example, AWS provides EC2 instances, Azure provides Virtual Machines, and VMware provides the ability to install a VMware cloud on AWS, also known as VMC, and run VMs.

Initially, in some embodiments of the invention, data is collected from VMs such as the VMs 302 . . . 310 at the cloud storage environment 300. In some embodiments, the data may be collected by, or at the direction of, the elastic cloud service 400, although that is not necessarily required. In other embodiments, the data may be pushed to the elastic cloud service 400 and/or other entities, by one or more of the VMs.

In some embodiments, such as where one or more of the VMs reside in a cloud storage environment, functionality implemented by the cloud vendor, such as in the form of agents for example, may be employed in the collection of data. For example, for cloud vendors such as AWS/Azure, such embodiments may directly use the application program interfaces (APIs) provided by the cloud vendor, or use a service supplied by the cloud vendor. In the AWS environment, embodiments may use Amazon Inspector Agents, and for Azure, Azure Log Analytics Azure Log Analytics.

The collected data may include, for example, VC-Ops data, or equivalent, that contains telemetry data. As used herein, 'telemetry data' is broad in scope and embraces, for example, diagnostics and operational data about a running system and/or one or more running applications. Thus, telemetry data may include error logs, event logs, events, time series metrics. As well, telemetry data may include application-specific information such as transaction times, latencies, response codes, and unexpected errors, as well as application errors, crashes, and user-measured response times. As a final example, telemetry data may include infrastructure layer information such as CPU load, memory consumption, disk space, and network bandwidth.

In addition to telemetry data, usage data may be collected concerning on one or more of the VMs. Note that as used herein, 'usage' data is broad in scope and embraces, among other things, information concerning the software and applications that are running on the VM, and the frequency with which such software and applications are used. The collected telemetry data and/or usage data may then be used as a basis for creating a user-specific user profile definition that may comprise a particular grouping of any number of features or attributes including information and/or data specific to a particular user. To build the user profile definition, it may be useful to extract and capture as much data as possible on a particular user from the telemetry data and usage data collected by a VM management tool, such as VC-Ops for example.

An example set of such features, of which there may be any number 'n,' may include statistics on CPU usage on a weekly basis, such as max/min/median, usage peak hours, a list of running application, and applications most used. Additional, or alternative, features may be included in one or more user profile definitions. For example, some other features may include identity and type of the physical components that are represented by a VM, where such physical components may include any of the components disclosed in FIG. 2. Further, a user profile definition may specify, for example, various VM parameters including, but not limited to, an amount of RAM, CPU frequency and number of cores, GPU type and size, and storage.

The user-specific user profile definition can then be used as a basis to define a user profile that is more generic, or general, relative to the user profile definition. Thus, two users may have the same user profile, but those same two users may have different respective user profile definitions.

The user profile may include general information about the configuration and/or operation of one or more of the VMs associated with a particular user. Examples of such information may include, but are not limited to, the aforementioned VM parameters, and a listing of applications. Additional, or alternative, information, which may be obtained from one or more user-specific user profile definitions, may be included in a user profile.

After user profiles have been created, the users may be clustered based on their user profile. Thus, even if users are associated with different respective companies for example, they may nonetheless be clustered, or associated, for the purposes of some embodiments of the invention. This approach leverages the fact that a particular cloud storage environment may include hundreds or thousands of VMs, for hundreds, or even thousands, of users. The relatively large number of users in a given cluster may thus provide a statistically significant population that can be usefully evaluated. By way of comparison, if only a few users, representing only one or a few different entities, were clustered together, it might be difficult in some circumstances to draw meaningful and useful conclusions from such a small population.

As well, the leveraging of a large population of users may be accomplished without exposing any private data of a user to the other users in the population. Thus, the advantage of evaluating a large population of users may be obtained without impairing or compromising the integrity of any user data.

When the users have been clustered, and evaluated by the elastic cloud service, the elastic cloud service may then suggest a VM configuration, or VM configurations, to each user based, for example, on a common problem or problems experienced by the users. The different VMs suggested may be the hardware configurations of one or more VMs in the cluster that are known to have performed well in the particular area of interest. The proposed VM configurations may have a different value than a value of the VM configurations that have been experiencing problems. For example, a proposed VM configuration may provide improved performance for the same, less, or marginally more such as about 5 percent, cost than the problematic VM configuration(s).

As used herein, 'value' refers to a ratio of the benefit achieved by a particular VM configuration divided by the cost required to implement and use that VM configuration, that is, Benefit/Cost. A greater value may be preferable to a lesser value and may be achieved by an increased benefit and/or a decreased cost.

Where a new user comes online, the elastic cloud service may automatically associate the new user with an existing user profile, or may generate a new user profile. As well, the new user may be assigned to an appropriate cluster, and receive a VM configuration recommendation. As with any other user, the performance and configuration, for example, of the new user may be periodically evaluated and new VM configurations recommended where appropriate. Depending upon the circumstances, the recommended VM configuration may require approval from a human user such as an administrator before implementation can be performed, or the recommended VM configuration may be automatically implemented, such as when certain criteria are met. For example, a recommended VM configuration may be implemented automatically when an application on a VM generates a particular error more than once per day, or when performance of that VM configuration deviates a certain amount, such as more than one standard deviation, from a median value or average value associated with the corresponding cluster.

D. General Aspects of Example Clustering and Associated Operations

With the foregoing discussion in view, further details are now provided concerning some example clustering operations, and operations for generating VM configuration recommendations. With particular attention to FIG. 3, the left hand FIG. 600*a* discloses a set of original unclustered data. The right hand FIG. 600*b* shows the same set of data, with various clusters defined according to the respective user profile definitions of a population of users.

In more detail, having a user profile definition that comprises, or consists of, 'n' features, the value of the 'n' features can be calculated for each user. In such embodiments, each user may be represented as a point in an 'n' dimensional space, and a cluster algorithm, such as k-means for example, can be employed to cluster the users. In general, k-means clustering refers to an unsupervised learning algorithm that partitions 'n' objects into k clusters, based on the nearest mean. That is, 'n' observations are partitioned into 'k' clusters in which each observation belongs to the cluster with the nearest mean. The parameter 'k' thus represents the number of clusters and can be determined by a domain expert, business needs, or one can find the optimal value of 'k' LU by using statistical testing methods.

Figure 3:
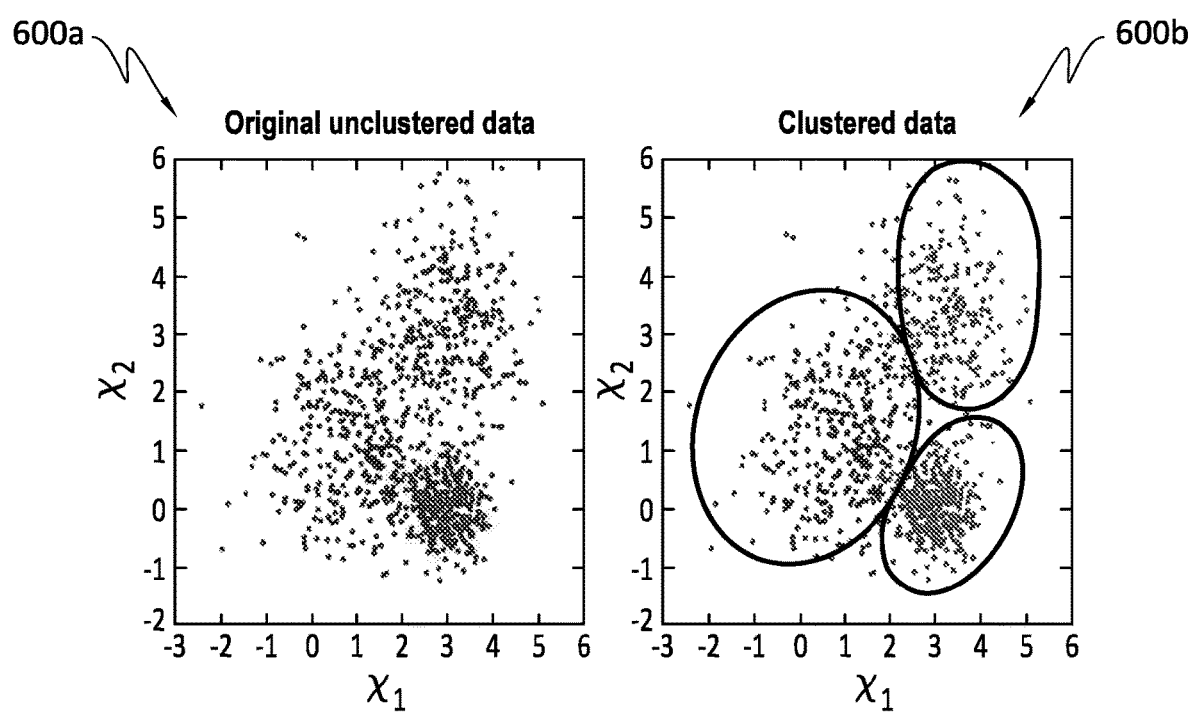
FIG. 3 discloses aspects of an example clustering methodology.

In the particular example of FIG. 3, the users are represented as points clustered in a two-dimensional space. As noted, the right hand FIG. 600*b* in FIG. 3 indicates that, in general, three different clusters have been defined, based on the respective user profile definitions of the users represented as points in FIG. 3. The scope of the invention is not limited to the k-means clustering technique and, more generally, any other clustering technique of comparable functionality may alternatively be employed in one or more embodiments of the invention.

With continued reference to the illustrative example of FIG. 3, and assuming that the number of user profile definition features 'n' is 2 in the illustrated example, each user can be plotted on the graph as a combination of an $X_1$ value (x-axis) and a $X_2$ value (y-axis). That is, $X_1$ corresponds to a value of feature 1 for that user, while $X_2$ corresponds to a value of feature 2 for that user. Thus, each user can be positioned on the graph according to its respective values for feature 1 and feature 2. After the users have been so positioned, the size, location, density, and extent, of one or more clusters can then be determined, as explained above.

As noted elsewhere herein, at least some embodiments of the inventor may be advantageous at least because each cluster may have an enormous number of users, and as such, the cluster(s) may be leveraged for crowd sourcing. In connection with the foregoing discussion concerning example clustering techniques, the users may be clustered in any of a variety of ways. For example, the users may be clustered based on the performance level of their VMs and the tools they are using. For each user that suffers from performance issues, or a single particular performance issue, a VM hardware configuration may be recommended based on the most common performance issue experienced by the users in the cluster. One possible outcome of this approach may be that, for a specific group of users, there is a performance satisfaction level that is required and may be achieved by implementing a particular hardware configuration.

A clustering process, and corresponding VM configuration changes, may be performed at any time. For example, a clustering process may be performed on an ad-hoc basis such as in response to the occurrence or non-occurrence of one or more particular events. As another example, a clustering process may be performed on a periodic basis, such as monthly for example. In some embodiments, clustering processes may be performed on multiple bases, such as ad-hoc in response to an event and also monthly. Because the needs of users may change over time, and due to the elastic nature of virtualization environments, it may be useful to perform multiple user clustering processes, and VM configuration changes, so as to dynamically meet the changing needs of the users. In this way, the user has some assurance that its VM configurations are well suited, or even optimally suited, to meet its specific and particular needs.

As evidenced by the disclosure herein then, embodiments of the invention may provide for, among other things, automated and proactive changes to one or more VM configurations to suit the particular, and changing, needs of one or more users. This may be accomplished at least in part through the creation of respective user profile definitions that are specific to a particular user. The processing of user-generated usage data, such as may be contained in a user profile definition, may be performed without human involvement and intervention, and thus may provide a clean and objective view both of the usage, and the corresponding need of the user.

As well, embodiments of the invention may enable connections and relations between users to be identified and usefully employed. For example, the definition of a user profile may enable a determination to be made as to whether two or more users are similar in one or more respects with regard to their VM configurations and usage. That is, embodiments may provide for analysis of the relation between the similar users, to examine their data usage with respect to each other, and to draw conclusions that can be extended from one user to other users. In a related aspect, the relatively large population of users may enable embodiments of the invention to develop VM configuration recommendations that has been field proven and tested many times on a variety of different scenarios.

E. Aspects of Example Methods

Figure 4:
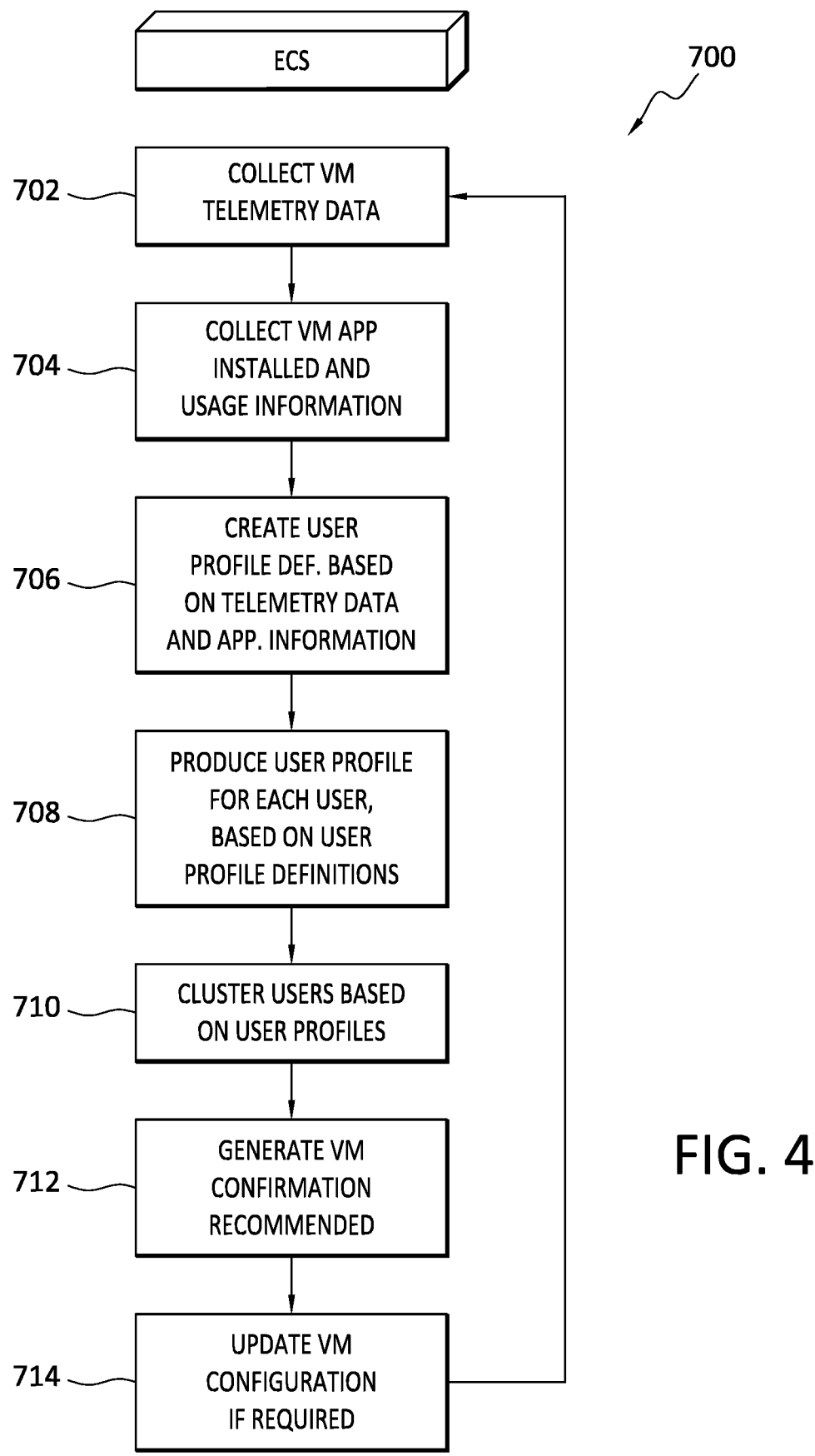
FIG. 4 discloses aspects of an example method.

With reference now to FIG. 4, details are provided concerning methods for generating and implementing a VM configuration, where one example method is denoted generally at 700. In at least some embodiments, the method 700 may be performed in whole, or in part, by an elastic cloud service, examples of which are disclosed herein. This is not required however and, in other embodiments, additional or alternative entities may perform portions, or all of, the method 700.

The example method 700 may begin when telemetry data is collected from one or more VMs in a population of VMs, which may reside in a cloud storage site, or other cloud site. The population of VMs may be defined to embrace only a subset, or all, of the VMs at that cloud site. As well, the population may span multiple different customers or enterprises, each of which has its own respective group of VMs at the cloud site. Before, after, or at the same time as collection of the telemetry data 702, information may also be collected from the VMs 704 that identifies, for each VM, the installed application, and application usage history for each application. The data and information collected at 702 and 704 may be collected directly from the VM(s) involved and/or may be collected from a storage location.

After collection of the telemetry data 702 and application information 704, a user profile definition may then be created 706 for each of the VMs in the population. The user profile definition may include some or all of the telemetry data and/or some or all of the application information. The user profile definition for each VM may also serve as the basis for creation 708 of a user profile for that VM. Both the user profile definitions and user profiles may be stored at the same cloud site where the VMs are located, although that is not required and the user profile definitions and/or user profiles may be stored elsewhere.

The various user profiles that have been created may then be used as a basis for clustering 710 the respective users with which the user profiles are associated. In general, the clustering 710 operation may involve comparing user profiles and clustering together users whose profiles are similar, or identical, in one or more respects such as, for example, their respective VM configurations and/or performance issues that have been noted. As noted herein, some embodiments may employ k-means clustering operations. Any number of clusters may result from the clustering operation 710. Thus, the clustering operation 710 may identify, and result in the definition of, one, two, three, or any higher number, of clusters.

The clustering operation 710 may also identify any users whose VM performance and operation falls outside an acceptable range. For example, a user whose VM(s) performance deviates from a median value of the cluster by a margin that exceeds an acceptable standard, may be identified as a candidate for an updated VM configuration. Likewise, the clustering operation 710 may also identify any users whose VM performance and operation falls within an acceptable range. For example, a user whose VM(s) performance falls within an acceptable range of, or matches, a median value of the cluster, may be identified as having a recommended VM configuration.

Accordingly, a recommendation may be generated 712 that identifies one or more user VMs that may be candidates to receive a VM configuration change in the form of the recommended VM configuration. One or more of the candidate VMs may then be modified to include the recommended VM configuration 714. The VM configuration change may be implemented automatically, or upon approval by a user such as an administrator at an entity that owns the VM. In some instances, a record may be maintained, such as at the cloud site and/or user premises, of the different VM configurations employed by one or more particular VMs, so as to enable a review of how the configurations of those VMs have changed over time.

Finally, and as indicated in FIG. 4, the method 700, or any portion(s) thereof, may be repeated from time to time. In some embodiments, the method 700, or any portion(s) thereof, may be performed continuously. In still other embodiments, the method 700, or any portion(s) thereof, may be performed only once, or a predetermined number of times.

F. Further Example Embodiments

Following are some further example embodiments of the invention. These are presented only by way of example and are not intended to limit the scope of the invention in any way.

Embodiment 1

A method, comprising: collecting telemetry data for each of a plurality of virtual machines (VM), and each of the VMs is associated with a user; collecting usage data for each of the VMs; creating a user profile definition for each user, and the user profile definition is created based on the telemetry data and usage data of the VMs associated with that user; creating, for each user, a user profile that is based on the user profile definition for that user; clustering the users based on similarity of their respective user profiles; and generating a recommended VM hardware configuration for a VM of one of the users.

Embodiment 2

The method as recited in embodiment 1, wherein the clustering of the users comprises a k-means clustering process.

Embodiment 3

The method as recited in any of embodiments 1-2, wherein the VMs for which telemetry data is collected comprises a population of VMs that spans multiple different cloud site users.

Embodiment 4

The method as recited in any of embodiments 1-3, wherein the recommended VM hardware configuration is a VM configuration associated with another user in the same cluster as the user for which the recommended VM hardware configuration was recommended.

Embodiment 5

The method as recited in any of embodiments 1-4, wherein the recommended VM configuration is a hardware configuration of a VM whose value meets or exceeds a value of an existing VM configuration.

Embodiment 6

The method as recited in any of embodiments 1-5, wherein each user profile definition is specific to a particular user.

Embodiment 7

The method as recited in any of embodiments 1-6, wherein the recommended VM hardware configuration has a value that exceeds a value of an existing VM hardware configuration of one of the VMs.

Embodiment 8

The method as recited in any of embodiments 1-7, wherein the method is performed automatically on a periodic basis.

Embodiment 9

The method as recited in any of embodiments 1-8, further comprising re-evaluating a user and re-assigning that user to a different cluster based upon the re-evaluating.

Embodiment 10

The method as recited in any of embodiments 1-9, further comprising: detecting that a new user has come online; automatically assigning a user profile to the new user; and assigning the new user to a cluster.

Embodiment 11

The method as recited in any of embodiments 1-10, wherein part or all of the method is performed by an elastic cloud service.

Embodiment 12

A method for performing any of the operations, methods, or processes, or any portion of any of these, disclosed herein.

Embodiment 13

A non-transitory storage medium having stored therein instructions that are executable by one or more hardware processors to perform the operations of any one or more of embodiments 1 through 12.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    collecting telemetry data for each of a plurality of virtual machines (VM), and each of the VMs is assigned to perform a task specified by a respective user;
    collecting usage data for each of the VMs;
    creating a user-specific profile definition for each user, and the user-specific profile definition is created based on the telemetry data and the usage data of the VMs associated with that user;
    for each user, using the user-specific profile definition for that user to create a user profile that is applicable to that user but is not limited to that user;
    creating a cluster of user profiles, wherein the user profiles are included in the cluster based on their similarity to each other, and wherein the similarity is determined based on the respective user-specific profile definitions that correspond to those user profiles that are included in the cluster, and the cluster includes a user profile associated with a VM whose performance and operation fail to meet an established requirement; and
    generating a recommended VM hardware configuration change for the VM whose performance and operation fails to meet the established requirement.

2. The method as recited in claim 1, wherein the usage data comprises, for one of the VMs, any one or more of: a list of applications running on that VM; information about hardware usage by that VM; or, a frequency with which one or more of the applications on that VM is used.

3. The method as recited in claim 1, wherein the VMs for which telemetry data is collected comprise a population of VMs that spans multiple different cloud site users.

4. The method as recited in claim 1, wherein the recommended VM hardware configuration change comprises a recommended VM hardware configuration associated with another user whose user profile is in the same cluster as the user profile for which the recommended VM hardware configuration change was recommended.

5. The method as recited in claim 4, wherein the recommended VM configuration is a hardware configuration of a VM whose value meets or exceeds a value of an existing VM configuration.

6. The method as recited in claim 1, wherein the cluster includes a user profile corresponding to a user whose VM performance meets or exceeds an established requirement.

7. The method as recited in claim 1, wherein the recommended VM hardware configuration has a value that exceeds a value of an existing VM hardware configuration of one of the VMs.

8. The method as recited in claim 1, wherein the recommended VM configuration is determined at least in part by striking a balance between (1) expected performance of the VM, whose performance and operation fails to meet the established requirement, after the recommended VM configuration is implemented in that VM and (2) an expected cost to implement the recommended VM configuration and use that VM after the recommended VM configuration is implemented.

9. The method as recited in claim 1, further comprising re-evaluating a user profile and re-assigning that user profile to a different cluster based upon the re-evaluating.

10. The method as recited in claim 1, further comprising:
    detecting that a new user has come online;
    automatically assigning a user profile to the new user; and
    assigning the user profile of the new user to a cluster.

11. A non-transitory storage medium having stored therein instructions that are executable by one or more hardware processors to perform operations comprising:
- collecting telemetry data for each of a plurality of virtual machines (VM), and each of the VMs is assigned to perform a task specified by a respective user;
- collecting usage data for each of the VMs;
- creating a user-specific profile definition for each user, and the user-specific profile definition is created based on the telemetry data and the usage data of the VMs associated with that user;
- for each user, using the user-specific profile definition for that user to create a user profile that is applicable to that user but is not limited to that user;
- creating a cluster of user profiles, wherein the user profiles are included in the cluster based on their similarity to each other, and wherein the similarity is determined based on the respective user-specific profile definitions that correspond to those user profiles that are included in the cluster, and the cluster includes a user profile associated with a VM whose performance and operation fail to meet an established requirement; and
- generating a recommended VM hardware configuration change for the VM whose performance and operation fails to meet the established requirement.

12. The non-transitory storage medium as recited in claim 11, wherein the clustering of the user profiles comprises performing a k-means clustering process.

13. The non-transitory storage medium as recited in claim 11, wherein the VMs for which telemetry data is collected comprise a population of VMs that spans multiple different cloud site users.

14. The non-transitory storage medium as recited in claim 11, wherein the recommended VM hardware configuration change comprises a recommended VM hardware configuration associated with another user whose user profile is included in the same cluster as the user profile of a user for which the recommended VM hardware configuration change was recommended.

15. The non-transitory storage medium as recited in claim 14, wherein the recommended VM configuration is a hardware configuration of a VM whose value meets or exceeds a value of an existing VM configuration.

16. The non-transitory storage medium as recited in claim 11, wherein the cluster includes a user profile corresponding to a user whose VM performance meets or exceeds an established requirement.

17. The non-transitory storage medium as recited in claim 11, wherein the recommended VM hardware configuration has a value that exceeds a value of an existing VM hardware configuration of one of the VMs.

18. The non-transitory storage medium as recited in claim 11, wherein the operations are performed automatically on a periodic basis.

19. The non-transitory storage medium as recited in claim 11, wherein the operations further comprise re-evaluating a user profile corresponding to a user and re-assigning that user profile to a different cluster based upon the re-evaluating.

20. The non-transitory storage medium as recited in claim 11, wherein the operations further comprise:
- detecting that a new user has come online;
- automatically assigning a user profile to the new user; and
- assigning the user profile of the new user to a cluster.

* * * * *